Apr. 10, 1923.
C. J. HOLSLAG
1,451,392
ELECTRODE FOR ELECTRIC ARC CUTTING OR REDUCING
Filed Nov. 15, 1921
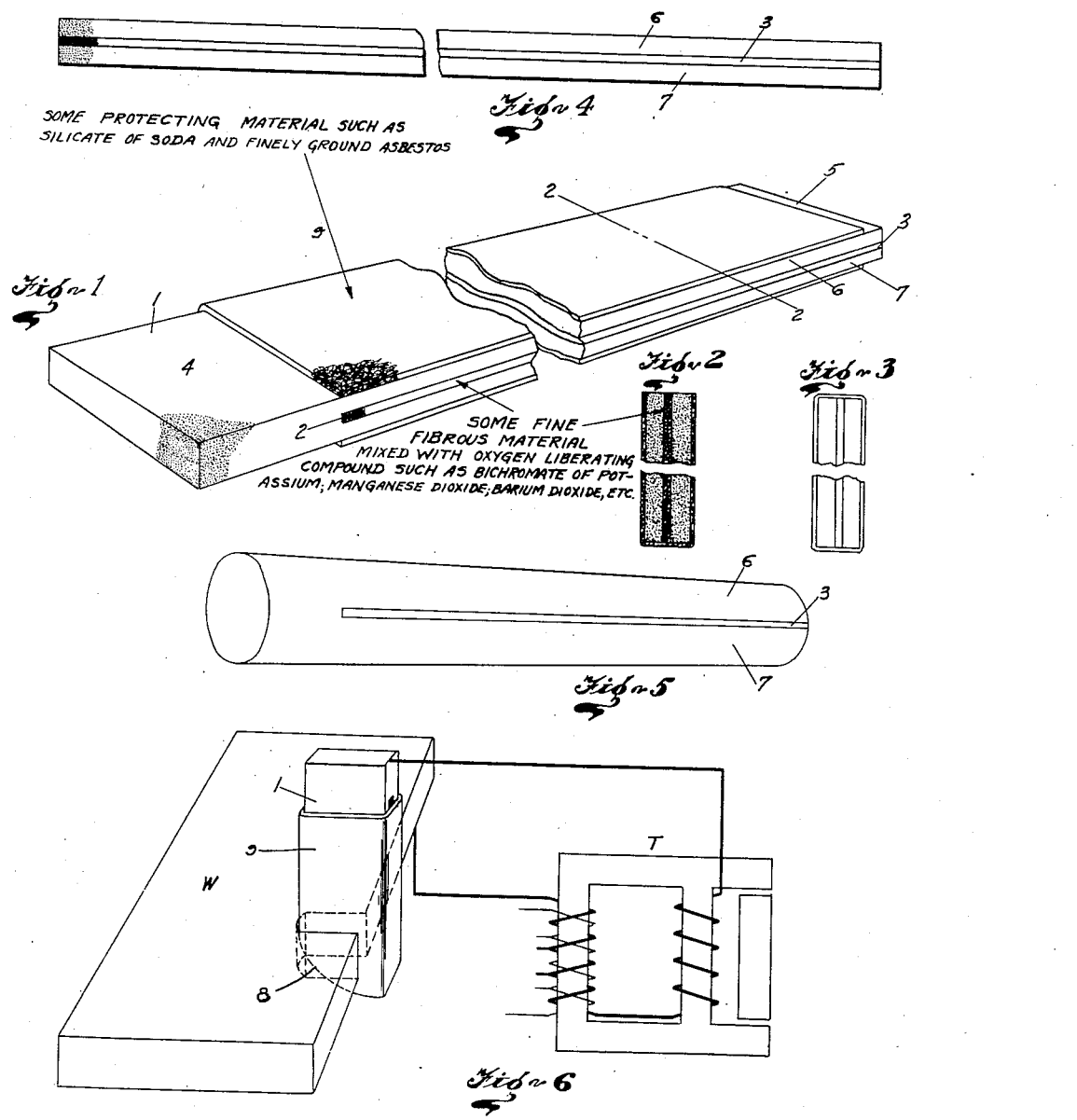
INVENTOR
Claude J. Holslag
BY
A.D.T. Libby
ATTORNEY Patented Apr. 10, 1923.

1,451,392

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRODE FOR ELECTRIC-ARC CUTTING OR REDUCING.

Application filed November 15, 1921. Serial No. 515,299.

*To all whom it may concern:*

Be it known that I, CLAUDE J. HOLSLAG, a citizen of the United States, residing at South Orange, in the county of Essex, State of New Jersey, have invented certain new and useful Improvements in Electrodes for Electric-Arc Cutting or Reducing, of which the following is a description, reference being had to the accompanying drawing and to the figures of reference marked thereon.

This invention relates to an electrode to be used in connection with an electric arc for cutting metal plates or reducing metals of different character and by way of illustration, but not limitation, I have shown the electrode used in connection with a source of alternating current, such as a transformer similar to that shown in my Patent 1,305,363 issued June 3, 1919. In my Patent 1,321,309 issued November 11, 1919, I have described a perforating, cutting and reducing electrode of a given type and for certain purposes as set forth in said patent.

My present invention relates to an improved form of cutting and reducing electrode. I have discovered that for cutting purposes if the electrode is made relatively wide as compared with its thickness, that it will cut the metal faster and leave a much cleaner edge than an electrode of the type described in my patent above referred to, although in my present invention I retain one of the fundamental ideas of my previous patent; that is to say, the oxygen liberating compound, but in addition I utilize a protecting coating over the outer surface of the electrode in order to prevent useless destruction or eating up of the electrode by the arc during the cutting or reducing process.

I have chosen to illustrate my invention in a drawing, in which—

Figure 1 is a view of one form of my electrode in which the protecting covering covers two sides and one edge of the electrode, leaving one edge bare;

Figure 2 is a section on the line 2—2 of Figure 1;

Figure 3 is a similar section as Figure 2, but with the entire periphery of the electrode covered with a protecting covering;

Figure 4 shows a modified form of electrode of the general form of Fig. 1 without the outer protecting covering.

Figure 5 shows my invention applied to a circular form of electrode; while

Figure 6 shows an electrode connected to a special transformer connected in a cutting circuit.

As illustrated, 1 is an electrode preferably of carbon or graphite. As shown in Fig. 1, this electrode is slotted up to the point 2 and the slot is filled with some fine fibrous material, such as asbestos, which has been impregnated with some oxygen liberating compound such as bichromate of potassium, manganese dioxide, barium dioxide, potassium per-manganate, potassium chlorate, etc. Mixed with the fibrous material and either one or more of the compounds above mentioned is silicate of soda which, in addition to its beneficial action in connection with the arc, is used as a binder to hold the material together and to the carbon or graphite electrode as the material has been forced into the slot 3.

In connection with the above ingredients I may in some cases use carbonate of calcium, as I have found this helps to float the impurities out of the molten metal, allowing the same to gasify quickly.

In certain classes of work I have found it advantageous to use a protecting covering on the outer periphery of the carbon or graphite. The object of this outer coating is to help control and concentrate the arc and prevent the electrode from heating up on the outside and burning away under the tremendous heat of the arc. I have found that a mixture of silicate of soda and finely ground asbestos is well adapted to this purpose as both have high heat resisting properties and burn away slowly, thereby materially increasing the life of the electrode, as well as giving the advantage of confining the arc to the desired point.

In some cases I prefer to leave one edge of the electrode as shown in Fig. 1 bare in order to assist in striking the arc and positioning it, altho it is to be understood I may cover the entire periphery of the electrode as shown in Fig. 3. When an outer coating is used as above described I prefer to leave the end of the electrode, as indicated at 4, uncovered in order to clamp the electrode in a suitable holder and also leave the opposite end 5 uncovered in order to assist in starting the arc.

As shown in Fig. 4, the electrode may consist of two sections 6 and 7, said sections being held together by the binding effect of the silicate of soda as previously set forth; although it is to be understood that the sections may be held together by other means. When an electrode built in this manner is put in the holder, the holder itself tends to hold the sections 6 and 7 together. However, I wish it to be understood that in the form shown in Figure 1, I consider the electrode as being made up substantially in two sections; that is to say, as used in the claims, this term is broad enough to cover both cases; that is a two-part electrode as shown in Fig. 4 and the electrode slotted for nearly its entire length as shown in Figure 1.

It is further to be understood that an electrode as indicated in Figure 4 may be covered with the protecting coating the same as illustrated in Figures 2 and 3.

For certain classes of work I prefer a circular electrode as shown in Figure 5, or the electrode may be elliptical in form, but in either case the electrode is either slotted for substantially its entire length or made in two complete sections as shown in Figure 4, the same material being used between the sections as has been previously described in connection with Fig. 1.

Figure 6 indicates diagrammatically the application of my electrode to a welding circuit, T being a special transformer adapted for this purpose, W the work to be cut and 1 the electrode. When either of the electrodes herein described are used for cutting purposes as shown in Figure 6, the arc is started at the edge of the metal and immediately the oxygen carried by the electrode in the manner described is quickly liberated under the heat of the arc and combines with the metal liquefying the same and carrying off considerable portions of gas, the balance being melted and drops through the cut, which due to the shape of my electrode, the same being for cutting purposes considerably wider than it is thick, produces a relatively narrow and square cut through the material. Since the temperature of the arc is extremely high, the electrode would get very hot and would rapidly disintegrate. In order to overcome this I have used a protecting covering as described.

While I have chosen certain forms of an electrode I do not wish to be limited to the exact details shown and described herein, as numerous changes will suggest themselves to one skilled in the art.

Having thus described my invention, what I claim is:

1. An electrode for use in electric arc cutting or reducing comprising a material arranged in substantially two sections and carrying a compound between said sections, said compound being adapted under the heat of the arc to give up oxygen freely for the purpose described.

2. An electrode for use in electric arc cutting or reducing comprising a material arranged in substantially two sections and carrying a compound between said sections, said compound being adapted under the heat of the arc to give up oxygen freely, said electrode having a protecting covering over its outer surface throughout the greater part of its length for the purpose described.

3. An electrode for use in electric arc cutting or reducing comprising a material arranged in substantially two sections and carrying a compound between said sections, said compound being adapted under the heat of the arc to give up oxygen freely, said electrode having a protecting covering over the major portion of its periphery throughout the greater part of its length as and for the purpose described.

4. An electrode for use in electric arc cutting or reducing, comprising a material rectangular in shape and arranged in substantially two sections and carrying a compound between said sections, said compound being adapted under the heat of the arc to give up oxygen freely for the purpose described.

5. An electrode for use in electric arc cutting or reducing, comprising a material rectangular in shape having a width considerably in excess of its thickness and arranged in substantially two sections and carrying a compound between said sections, said compound being adapted under the heat of the arc to give up oxygen freely for the purpose described.

6. An electrode for use in electric arc cutting or reducing, comprising a material rectangular in shape having a width considerably in excess of its thickness and arranged in substantially two sections and carrying a compound between said sections, said compound being adapted under the heat of the arc to give up oxygen freely, said electrode having a protecting covering over its outer surface throughout the greater part of its length for the purpose described.

7. An electrode for use in electric arc cutting or reducing, comprising a material rectangular in shape having a width considerably in excess of its thickness and arranged in substantially two sections and carrying a compound between said sections, said compound being adapted under the heat of the arc to give up oxygen freely, said electrode having a protecting covering, over two sides and one edge throughout the greater part of its length.

8. An electrode for use in electric arc cutting or reducing comprising a graphitic substantially two part structure and carrying a compound between said two parts, which is adapted under the heat of the arc to give up oxygen freely for the purpose described.

9. An electrode for use in electric arc cutting or reducing, comprising a graphitic substantially two part structure and carrying a compound between said two parts, which is adapted under the heat of the arc to give up oxygen freely, said electrode having an outer coating of protecting material.

10. An electrode for use in electric arc cutting or reducing comprising a graphitic substantially two part structure and carrying a compound, between said two parts, which is adapted under the heat of the arc to give up oxygen freely, said electrode having an outer coating of silicate of soda and finely powdered asbestos.

11. An electrode for use in electric arc cutting or reducing, comprising a graphitic substantially two part structure and carrying a compound, between said two parts, which contains a material such as bichromate of postassium, barium dioxide, manganese dioxide, postassium per-manganate, potassium chlorate, etc. adapted under the heat of the arc to liberate a quantity of oxygen to assist in liquefying and gasifying the metal to be cut or reduced.

12. An electrode for use in electric arc cutting or reducing, comprising a graphitic substantially two part structure and carrying a compound, between said two parts, which contains a material such as bichromate of potassium, barium dioxide, manganese dioxide, potassium per-manganate, potassium chlorate, etc. adapted under the heat of the arc to liberate a quantity of oxygen to assist in liquefying and gasifying the metal to be cut or reduced, said electrode having an outer coating of protecting material.

13. An electrode for use in electric arc cutting or reducing, comprising a graphitic substantially two part structure and carrying a compound, between said two parts, which contains silicate of soda, and a compound which gives up freely, under the heat of the arc, a considerable quantity of oxygen for the purpose described.

14. An electrode for use in electric arc cutting or reducing, comprising a graphitic substantially two part structure and carrying a compound, between said two parts, which contains silicate of soda, calcium carbonate and a compound which gives up freely, under the heat of the arc, a considerable quantity of oxygen for the purpose described.

15. An electrode for use in electric arc cutting or reducing, comprising a graphitic substantially two part structure and carrying a compound, between said two parts, which contains silicate of soda and a compound which gives up freely, under the heat of the arc, a considerable quantity of oxygen, said electrode having an outer coating over most of its length of a protecting material.

16. An electrode for use in electric arc cutting or reducing, comprising a graphitic substantially two part structure and carrying a compound, between said two parts, which contains silicate of soda, calcium carbonate and a compound which gives up freely, under the heat of the arc, a considerable quantity of oxygen, said electrode having an outer coating over most of its length of a protecting material.

In testimony whereof, I affix my signature.

CLAUDE J. HOLSLAG.